(12) United States Patent
Bush

(10) Patent No.: US 9,784,145 B2
(45) Date of Patent: Oct. 10, 2017

(54) ATOMIZATION VALVE

(76) Inventor: Steve G. Bush, Pleasant Hill, CA (US)

( * ) Notice: Subject to any disclaimer, the term of this patent is extended or adjusted under 35 U.S.C. 154(b) by 0 days.

(21) Appl. No.: 11/933,958

(22) Filed: Nov. 1, 2007

(65) Prior Publication Data
US 2009/0114182 A1 May 7, 2009

(51) Int. Cl.
*F01L 3/06* (2006.01)

(52) U.S. Cl.
CPC .............. *F01L 3/06* (2013.01); *Y02T 10/146* (2013.01)

(58) Field of Classification Search
CPC ........................................ F01L 3/06
USPC ............. 123/306, 188.2, 188.16, 188.3
See application file for complete search history.

(56) References Cited

U.S. PATENT DOCUMENTS

| 1,539,167 | A | * | 5/1925 | Diel et. al. | .............. 123/188.7 |
| 4,137,886 | A | * | 2/1979 | Hiramatsu | ............... F01L 3/06 |
| | | | | | 123/188.11 |
| 4,744,340 | A | * | 5/1988 | Kirby | .................. F01L 3/06 |
| | | | | | 123/188.14 |
| 5,771,852 | A | * | 6/1998 | Heimann et al. | .......... 123/188.3 |
| 2008/0011268 | A1 | * | 1/2008 | Sawyer | .................... F01L 3/06 |
| | | | | | 123/306 |

* cited by examiner

*Primary Examiner* — Kevin A Lathers
(74) *Attorney, Agent, or Firm* — Ray K. Shahani, Esq.; Leo H. K. Lai

(57) ABSTRACT

An atomization valve for use as an intake valve in an internal combustion engine that consists essentially of an elongated valve stem with two opposed ends, a valve head located at one of the two opposed ends and formed integrally with the valve stem in which the valve head having an outer rim and a tapered shoulder portion terminating adjacent the stem portion and the tapered shoulder portion having an upper surface bearing a plurality of grooves.

10 Claims, 3 Drawing Sheets

Figure 1:
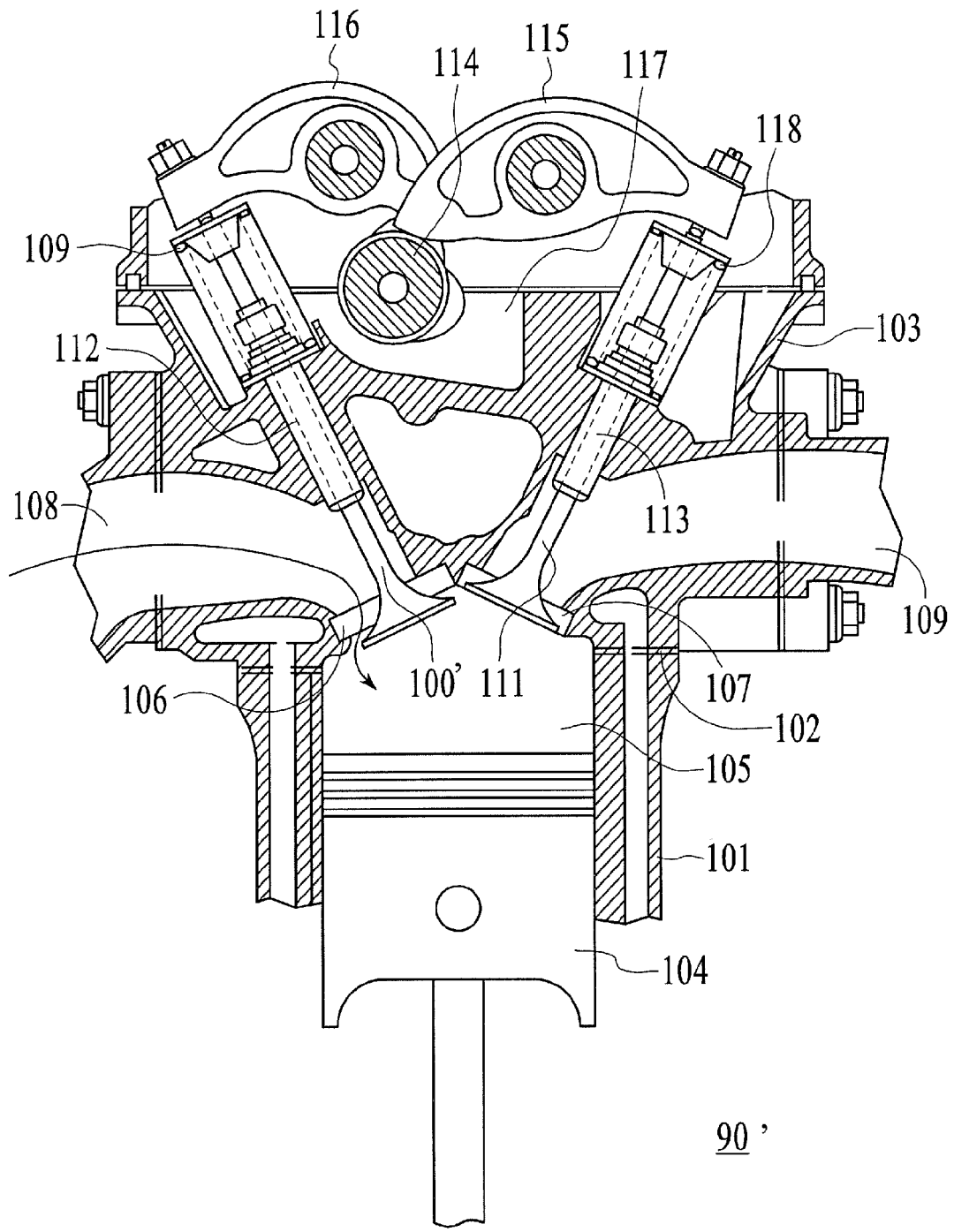

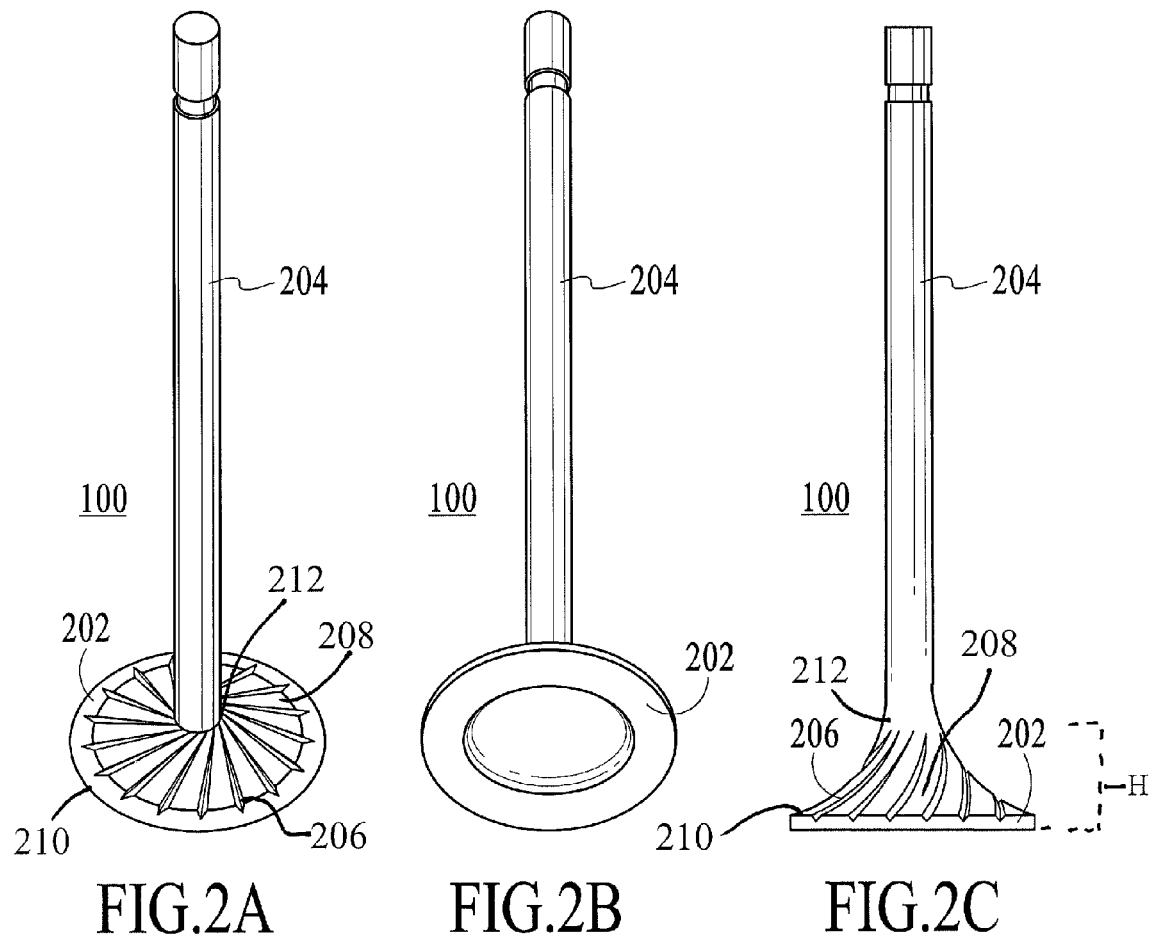
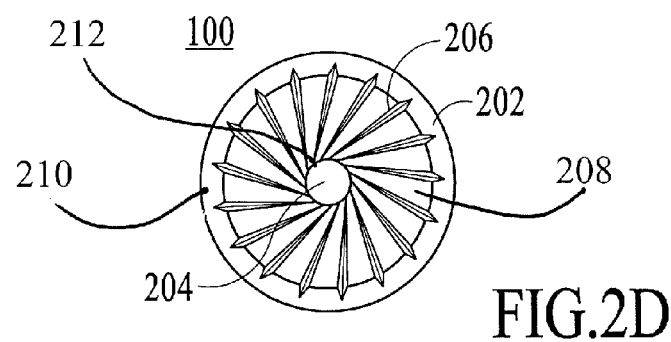

ATOMIZATION VALVE

FIELD OF THE INVENTION

The present invention relates generally to an internal combustion engine intake valve, and more specifically to a structurally unique intake valve that facilitates even distribution and atomization of gasoline and/or other fuels within the cylinder, thereby boosting the overall power and performance of the engine.

BACKGROUND OF THE INVENTION

An internal combustion engine is a heat engine in which the burning of a fuel such as hydrocarbons occurs in a confined space called a combustion chamber. This exothermic reaction of a fuel with an oxidizer creates gases of high temperature and pressure, which are permitted to expand. The defining feature of an internal combustion engine is that useful work is performed by the expanding hot gases acting directly to cause movement, for example by acting on pistons, rotors, or even by pressing on and moving the entire engine itself. One of the most common internal combustion engines in automobiles are piston engines.

Valves are used in most piston engines to open and close the intake and exhaust ports in the cylinder head. The valve is usually a flat disk of metal with a long rod known as the valve stem extending from one end. The stem is used to push down on the valve and open it, with a spring generally used to close it when the stem is not being pushed on. Desmodromic valves are closed by positive mechanical action instead of by a spring, and are used in some high speed motorcycle and auto racing engines, eliminating 'valve float' at high RPM.

The power output of the engine is dependent, at least in part, on the ability of the engine to allow large volume flow of both air-fuel mixture and exhaust gas through the respective valve ports, typically located in the cylinder head. Therefore a great number of resources are used in designing this part of an engine. Factory flow specifications are generally lower than what the engine is capable of, but due to the time-consuming and expensive nature of smoothing the entire intake and exhaust track, compromises in flow for reduction in cost is often made. In order to gain power, irregularities such as casting flaws are removed and with the aid of a flow bench, the radii of valve port turns and valve seat configuration can be modified to promote high flow. This process is called porting, and can be done by hand, or via CNC machine.

There are many common design and porting strategies to increase flow. Increasing the diameter of the valves to take up as much of the cylinder diameter as possible to increase the flow into the intake and exhaust ports is one method. However, increased valve size can increase valve shrouding, i.e., the impedance of flow created by the cylinder wall. To counteract this adverse effect, valves are commonly designed to open into the middle of the cylinder, such as the Dodge Hemi or the Ford Cleveland engines with canted valves. Also, increasing valve lift, or the distance valves are opened into the cylinder or using multiple smaller valves can increase flow. With the advent of computer technology, in modern engines valves events can be controlled directly by the engines computer, optimizing engine operation at any speed or load. Atomization is conversion of bulk liquid into a spray or mist, i.e., collection of drops, often by passing the liquid through a nozzle.

An atomizer is an atomization apparatus—carburetors, airbrushes, misters, and spray bottles are only a few examples of atomizers used ubiquitously. In internal combustion engines, fine-grained fuel atomization is instrumental to efficient combustion.

ADVANTAGES AND SUMMARY OF THE INVENTION

The present invention is an improved intake valve in an internal combustion engine mainly in automobiles to enhance atomization of fuel/air during the intake stroke. With a special engravement on the upper surface of the valve head portion, the atomization of intake fuel/air mixture is much enhanced and consequently the efficiency of the entire engine.

One object of the present invention is to enhance atomization of fuel and air mixture and increase the degree of combustion of fuel in an internal combustion engine.

Another object of the present invention is to increase the fuel efficiency of an internal combustion engine.

Another object of the present invention is to increase atomization of fuel entering a combustion chamber of an internal combustion engine.

Another object of the present invention is that it helps reduce pollutants in the exhaust gas emission of an automobile.

Yet another object of the present invention is that it can be made in any valve dimension and henceforth is completely interchangeable with any intake valve that is being used in the engine.

The present invention is an atomization valve for use as an intake valve in an internal combustion engine. The atomization valve consists essentially of an elongated valve stem with two opposed ends, a valve head that is located at one of the two opposed ends and formed integrally with the valve stem. The valve head also has an outer rim and a tapered shoulder portion that terminates adjacent to the valve stem portion and the tapered shoulder portion has an upper surface bearing a plurality of grooves.

The plurality of grooves on the atomization valve extend from the valve stem to the outer rim.

The plurality of grooves on the atomization valve extend radially from the valve stem to the outer rim.

The plurality of grooves on the atomization valve extend from the valve stem to the outer rim at an angle oblique to the radius.

The plurality of grooves on the atomization valve extend spirally from the valve stem to the outer rim.

The plurality of grooves on the atomization valve are in the shape of a straight line or a curve.

The plurality of grooves on the atomization valve have a depth of between about 0.01 mm and about 5.0 mm.

The plurality of grooves on the atomization valve have a depth of between about 0.1 mm and about 4.0 mm.

The plurality of grooves on the atomization valve have a depth of between about 0.5 mm and about 3.0 mm.

The plurality of grooves on the atomization valve have a Vee-shaped cross section, a square-shaped cross section, a H-shaped cross section, a I-shaped cross section, a U-shaped cross section, an oval-shaped cross section or an irregular-shaped cross section.

The plurality of grooves on the atomization valve have regular, patterned surfaces.

The plurality of grooves on the atomization valve have regular, serrations essentially perpendicular to the plurality of grooves.

The plurality of grooves on the atomization valve have irregular, random-patterned surfaces.

Figure 3:
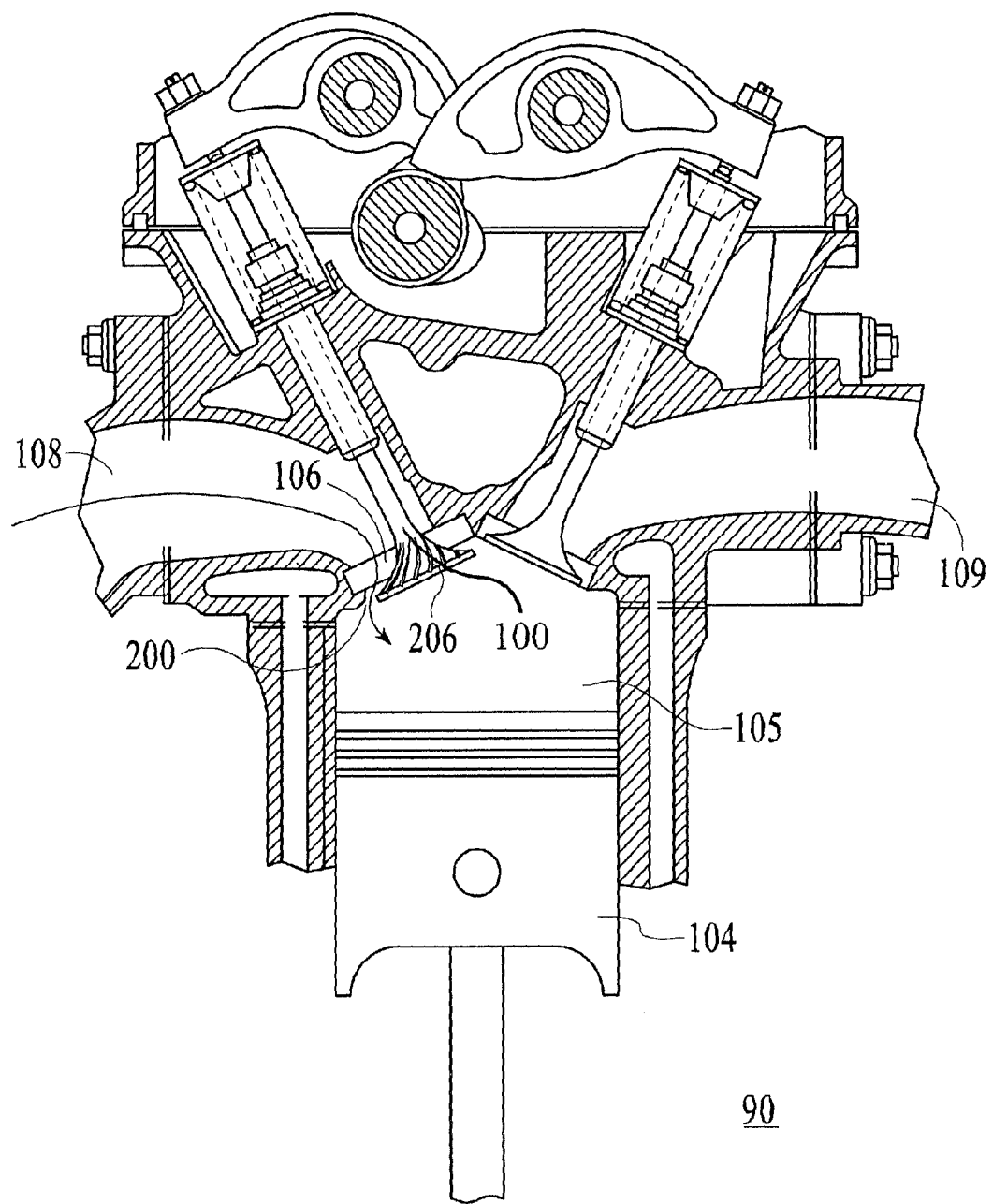

Further details, objects and advantages of the present invention will be come apparent through the following descriptions, and will be included and incorporated herein.

BRIEF DESCRIPTION OF THE DRAWINGS

FIG. 1 is a longitudinal section view of an internal combustion engine 90' of the prior art.

FIG. 2A is a representative schematic upper view of the atomization valve of the present invention 100.

FIG. 2B is a representative schematic lower view of the atomization valve of the present invention 100.

FIG. 2C is a representative isometric side view of the atomization valve of the present invention 100.

FIG. 2D is a representative top view of the atomization valve of the present invention 100.

FIG. 3 is a front view of a longitudinal section of an internal combustion engine 90 showing the atomization valve of the present invention 100 during the intake stroke.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event parts of different embodiments have similar functions or uses, they may have been given similar or identical reference numerals and descriptions. It will be understood that such duplication of reference numerals is intended solely for efficiency and ease of understanding the present invention, and are not to be construed as limiting in any way, or as implying that the various embodiments themselves are identical.

FIG. 1 is a representative longitudinal section view of an internal combustion engine 90' of the prior art. As shown in FIG. 1, in one version of the prior art, in an OHC type internal combustion engine 90', a cylinder head 103 is mounted on a deck surface of a cylinder block 101 with a gasket 102 interposed therebetween. In one version of the prior art, cylinder head 103 is provided with a combustion chamber 105 facing an upper surface of a piston 104, and intake and exhaust ports 108 and 109 respectively having intake and exhaust valve bores 106 and 107 opened into the combustion chamber 105. In one version of the prior art, intake port 108 is connected to an intake system which is not shown, and the exhaust port 109 is connected to an exhaust system which is not shown. Intake and exhaust valves 100' and 111' are slidably carried in a Vee-shape in the cylinder head 103 through valve guides 112 and 113, respectively, and adapted to open and close the intake and exhaust valve bores 106 and 117. In one version of the prior art, intake and exhaust valves 100' and 111' are opened and closed at a predetermined timing by cooperation of a valve operating mechanism 117 including a cam shaft 114 and rocker arms 115 and 116 with valve springs 118 and 119.

In one version of the prior art, during intake stroke, fuel and air mixture flows from intake port 108, through intake valve bore 106 that is generated between intake valve 100' and internal wall of combustion chamber 105. As shown in FIG. 1, fuel and air mixture flows through the surface of valve head portion 202 of intake valve 100' before entering combustion chamber 105.

FIG. 2A is a representative schematic upper view of the atomization valve of the present invention 100. As best shown in FIGS. 2A and 2B, structure of the atomization valve of the present invention 100 is similar to intake valves 100' that are currently being used in automobiles. In one embodiment, the atomization valve of the present invention 100 consists of valve stem portion 204 and valve disc portion 202. As best shown in FIGS. 1 and 2A, just as any other prior art intake valves 100', in one embodiment, valve stem portion 204 allows the atomization valve of the present invention 100 to slide in and out of cylinder head 103 through valve guides 112.

In one embodiment, the atomization valve of the present invention 100 can be manufactured in the similar manner that current intake valves and materials they are therefore made of. As shown in FIGS. 2A and 2C, the distinctive feature of the atomization valve of the present invention 100 is the singularity and/or plurality of slit grooves 206 that are engraved on the upper or top surface 208 of valve disc or head portion 202. As shown in FIG. 2A and FIG. 2B, in one embodiment, slit grooves 206 are either vertical or slight curved slits radiate from the center of valve disc or head portion 202 to almost to the rim of valve head portion 202 on the upper surface 208.

In one embodiment, the number of slit grooves 206 should be in the range of between about 2 and about 20 depending on the size, materials of construction, etc., of the atomization valve of the present invention 100. In one embodiment, the atomization valve of the present invention 100 can be manufactured by simply creating slit grooves 206 on existing intake valve 100 by simple machinery such as a milling, embossing, engraving or machining tool, or even hand crafted. The shapes, depth and quantity of slit grooves 206 can be adjusted to fit certain internal combustion engine 90'.

FIG. 2B is a representative schematic lower view of the atomization valve of the present invention 100. As shown in FIG. 2B, slit grooves 206 created on the upper surface of valve head portion do not puncture or otherwise extend completely through the entire thickness of the valve head portion 202.

FIG. 2C is a representative isometric side view of the atomization valve of the present invention 100. FIG. 2D is a representative top view of the atomization valve of the present invention 100. As shown in FIGS. 2C and 2D, in an embodiment there is a plurality of slit grooves 206 created to radiate from valve stem 204 to almost the rim of valve head portion 202. However, other slit grooves 206 may be created for different degree of atomization.

Additionally, the outer lip 210 is at a lower position than the inner stem base 212 of the stem portion 204. Thus, it will be understood that a vertical height H separates the lip 210 and the inner stem base 212 and the upper surface 208 bears the series of grooves or etchings 206.

FIG. 3 is a front view of a longitudinal section of an internal combustion engine 90 showing regular intake valve 100 is replaced by the atomization valve of the present invention 100 during the intake stroke. As shown in FIG. 3, in one embodiment during intake stroke, atomization valve of the present invention 100 is pushed down hence creating an opening intake port 108 for fuel and air mixture to flow through. As shown in FIG. 3, in one embodiment, fuel and air mixture flows through and across, over and upon the upper surface of valve head portion 202 of the atomization valve of the present invention 100. In one embodiment, by flowing across a surface that bears a series of slit grooves 206, the degree of atomization of fuel and air mixture is enhanced in comparison with fuel flowing over the smooth upper surface of valve head portion of an intake valve 100' of the prior art.

It will be understood that flow of fuel across the engraved slits 206 upon the upper surface 208 of the valve head portion 202 assists in atomization of fuel into optimum condition for combustion. The cross-section shape of the slit or grooves 206 can be U-shaped or oval, Vee-shaped, half-moon shaped, other elliptical shape, square or keyed, S-channel, I-channel, H-channel, etc. Additionally, there can be a chatter-mark or other pattern through the length of each slit or groove 206. The slots or grooves 206 can be angled across the upper surface 208 of the head portion 202, such as shown in the top view FIG. 2D of the valve 100 of the present invention. The grooves 206 can also lead straight out from the center of the stem 204 to the outer rim of the disc head portion 202 rather than at an angle, or can be curved. Essentially any repeating or random pattern can be used for the series of grooves 206 on the upper surface 208 of the disc 202.

It will be understood that anywhere between about 0 and about 360 or more slots or grooves 206 can be etched or milled into the upper surface 208 of the valve head portion 202. As described above, the slots or grooves 206 can also be banked or arched, at various and/or at varying bank rates and arc rates. It will be understood that these grooves or etchings 206 can be formed by casting, scoring grooves, milling, mechanical or chemical or electronic etch, machining or similar means. The grooves 206 can be formed simultaneously with the formation of the valve stem 204 and head portions 202, or subsequent to valve construction.

It will further be understood that the valve 100 of the present invention are suitable for use in regular and lead-free gasoline or diesel fuel vehicles. The present invention can also be used in rotary-valve 2-cycle engines. Vehicles can include cars, trucks, vans, buses, other utility and recreational and other passenger vehicles, cargo transports, race cars, heavy equipment, boats, and other vehicles.

Example: Use in Power Boat Experiment

In an initial test of the feasibility and overall performance of an engine enhanced with the valve 100 of the present invention, a standard powerboat was utilized. Significant fuel savings were achieved upon utilization of the valve 100. Additionally, both increased high-end as well as low-end torque was achieved and experienced by the operators of the vessel.

Example: Increased Gas Mileage

In a further experiment, a Geo Prizm automobile was used. Mileage increased from 37 miles per gallon while using the standard valves 100' of the prior art, to about 64 miles per gallon using the improved valves 100 of the present invention.

Example: Smog Check Vehicle Inspection Report (VIR)

The test was a regular Smog Check carried out by a certified Smog Check Test Station. Two sets of test results are submitted. The first was a control test (Table 1) as internal combustion engine 90' with regular intake valve 100' being tested. The second test (Table 2) is on the exact same internal combustion engine 90 except that the presented invention of atomization valve 100 replaced the regular intake valve 100'.

It will be understood that the test vehicle was used only to demonstrate the dramatic increase in fuel efficiency and decrease in emissions possible through use of the valve 100 of the present invention. Furthermore, the test vehicle used was in need of a replacement catalytic convertor, and therefore was not compliant with current vehicle emission standards ab initio.

TABLE 1

| Test | RPM | % $CO_2$ MEAS | % $O_2$ MEAS | HC (PPM) MAX | HC (PPM) GP | HC (PPM) MEAS | CO (%) MAX | CO (%) GP | CO (%) MEAS | NO (PPM) MAX | NO (PPM) GP | NO (PPM) MEAS |
|---|---|---|---|---|---|---|---|---|---|---|---|---|
| 15 mph | 1884 | 14.5 | 0.7 | 130 | 305 | 90 | 0.80 | 2.30 | 0.12 | 835 | 2054 | 3357 |
| 25 mph | 1885 | 14.6 | 0.5 | 105 | 255 | 78 | 0.69 | 2.19 | 0.14 | 774 | 1854 | 2986 |

TABLE 2

| Test | RPM | % $CO_2$ MEAS | % $O_2$ MEAS | HC (PPM) MAX | HC (PPM) GP | HC (PPM) MEAS | CO (%) MAX | CO (%) GP | CO (%) MEAS | NO (PPM) MAX | NO (PPM) GP | NO (PPM) MEAS |
|---|---|---|---|---|---|---|---|---|---|---|---|---|
| 15 mph | 1871 | 13.6 | 2.0 | 130 | 305 | 351 | 0.80 | 2.30 | 0.15 | 835 | 2054 | 2906 |
| 25 mph | 1888 | 13.4 | 2.2 | 105 | 255 | 228 | 0.69 | 2.19 | 0.11 | 774 | 1854 | 307 |

Upon inspection of the data, it is observed that emissions decrease dramatically upon upgrading to valves 100 of the present invention. Emission of carbon dioxide, for example, dropped almost 7.5% from 14.6 to 13.4 at 25 mph, while emission of carbon monoxide dropped almost 27%, or from 0.14 to 0.11 at 25 mph. Other decrease in nitrogen monoxide, such as at slower speeds, is also observed.

From test results of Table 1 and Table 2, it is obvious that there is a drop in unburnt fuel. Suggesting that fuel is being consumed more completely and hence fuel efficiency. Since both tested engines are literally the same except for the use of the atomization valve of the present invention 100 in the second test. It is therefore assumed that the increase in fuel efficiency is largely due to the structure of the atomization valve of the present invention 100.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. An atomization valve for use as an intake valve in an internal combustion engine, the atomization valve comprising:
    an elongated valve stem having two opposed ends; and
    a valve head located at one of the two opposed ends and formed integrally with the valve stem, the valve head having an outer rim, a tapered shoulder portion having an upper surface terminating adjacent the stem portion, and a plurality of grooves extending from the valve stem, across the upper surface and partly through the outer rim.

2. The atomization valve of claim 1 in which the plurality of grooves are in the shape of a straight line.

3. The atomization valve of claim 1 in which the plurality of grooves are in the shape of a curve.

4. The atomization valve of claim 1 in which the plurality of grooves having a depth of between about 0.01 mm and about 5.0 mm.

5. The atomization valve of claim 1 in which the plurality of grooves having a depth of between about 0.1 mm and about 4.0 mm.

6. The atomization valve of claim 1 in which the plurality of grooves having a depth of between about 0.5 mm and about 3.0 mm.

7. The atomization valve of claim 1 in which the plurality of grooves have a Vee-shaped cross section.

8. The atomization valve of claim 1 in which the plurality of grooves extend radially from the valve stem, across the upper surface and partly through the outer rim.

9. The atomization valve of claim 1 in which the plurality of grooves extend from the valve stem, across the upper surface and partly through the outer rim at an angle oblique to the radius of the valve head.

10. The atomization valve of claim 1 in which the plurality of grooves extend in a spiral from the valve stem, across the upper surface and partly through the outer rim.

* * * * *